US011784874B2

(12) United States Patent
Krishnamurthy et al.

(10) Patent No.: US 11,784,874 B2
(45) Date of Patent: Oct. 10, 2023

(54) BULK DISCOVERY OF DEVICES BEHIND A NETWORK ADDRESS TRANSLATION DEVICE

(71) Applicant: Juniper Networks, Inc., Sunnyvale, CA (US)

(72) Inventors: Pradeep H. Krishnamurthy, Bangalore (IN); Chandrasekhar A, Bangalore (IN); Rahamath Sharif, Bangalore (IN); Raviraj Satish Deshmukh, Pune (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/669,869

(22) Filed: Oct. 31, 2019

(65) Prior Publication Data

US 2021/0135935 A1    May 6, 2021

(51) Int. Cl.
*G06F 15/16*   (2006.01)
*H04L 41/0806* (2022.01)
(Continued)

(52) U.S. Cl.
CPC ...... *H04L 41/0806* (2013.01); *H04L 41/0893* (2013.01); *H04L 41/12* (2013.01); *H04L 41/28* (2013.01)

(58) Field of Classification Search
CPC . H04L 41/0806; H04L 41/0893; H04L 41/12; H04L 41/28
(Continued)

(56) References Cited

U.S. PATENT DOCUMENTS 7,151,884 B1 * 12/2006 Rayes ............... H04L 41/0803
370/254
7,274,684 B2   9/2007 Young et al.
(Continued)

FOREIGN PATENT DOCUMENTS

CA    2696078 A1 *  2/2009 ........... G06Q 20/208
CN    1599330 A      3/2005
(Continued)

OTHER PUBLICATIONS

Automatically Configuring the IP Addresses for Mobile Network in Collaborative Network Binke Ou;Ping Dong 2020 IEEE 5th Information Technology and Mechatronics Engineering Conference (ITOEC) (Year: 2020).*
(Continued)

*Primary Examiner* — Oscar A Louie
*Assistant Examiner* — Oluwatosin M Gidado
(74) *Attorney, Agent, or Firm* — Shumaker & Sieffert, P.A.

(57) ABSTRACT

A network management system may discover a plurality of network devices behind a network address translation device, such as a firewall. The network management system may receive a model of N network devices, generate a bulk activation configuration for the N network devices and commit the bulk activation configuration on a seed network device. The network management system may receive a request for a first connection from a first neighboring network device and may connect to the first neighboring network device. The first neighboring network device may have received the bulk activation configuration from the seed device. The network management system may determine whether the first neighboring network device is one of the N network devices and commit a second activation configuration on the first neighboring network device if it is (Continued)

one of the N network devices. A plurality of neighboring network device may be configured in this fashion.

18 Claims, 4 Drawing Sheets

(51) Int. Cl.
  *H04L 41/0893* (2022.01)
  *H04L 41/12* (2022.01)
  *H04L 41/28* (2022.01)
(58) Field of Classification Search
  USPC .......................................................... 709/223
  See application file for complete search history.

(56) References Cited

U.S. PATENT DOCUMENTS

| | | | |
|---|---|---|---|
| 7,706,371 | B1 | 4/2010 | Wing et al. |
| 7,821,967 | B2 | 10/2010 | Shimura et al. |
| 7,903,585 | B2 | 3/2011 | Feng et al. |
| 7,966,391 | B2 * | 6/2011 | Anderson ............... H04L 41/28 703/22 |
| 8,701,175 | B2 | 4/2014 | Edwards et al. |
| 8,825,816 | B2 | 9/2014 | Deutsch et al. |
| 9,253,034 | B1 * | 2/2016 | Krishnamurthy ... H04L 41/0889 |
| 9,680,704 | B2 | 6/2017 | Pera et al. |
| 9,769,139 | B2 | 9/2017 | Chizhov et al. |
| 9,893,940 | B1 * | 2/2018 | Chawla ............... H04L 41/0816 |
| 9,900,301 | B2 | 2/2018 | Yanacek et al. |
| 10,374,916 | B1 | 8/2019 | A et al. |
| 10,708,385 | B2 | 7/2020 | Tachi et al. |
| 2002/0178239 | A1 * | 11/2002 | Kinyon ............... G06F 9/44505 709/220 |
| 2007/0189190 | A1 | 8/2007 | Feng et al. |
| 2008/0271056 | A1 * | 10/2008 | Burchfield ............ G06F 3/0605 719/327 |
| 2010/0215025 | A1 * | 8/2010 | Fujii ................... H04L 41/0886 370/338 |
| 2010/0235481 | A1 | 9/2010 | Deutsch et al. |
| 2011/0106921 | A1 * | 5/2011 | Brown ............... H04L 67/1095 709/221 |
| 2012/0191875 | A1 * | 7/2012 | Kano ................... H04L 61/103 709/245 |
| 2014/0075541 | A1 | 3/2014 | Young |
| 2014/0258479 | A1 | 9/2014 | Tenginakai et al. |
| 2015/0026313 | A1 * | 1/2015 | Chawla ............... H04L 41/5035 709/220 |
| 2015/0088964 | A1 * | 3/2015 | Shiell .................... G06F 12/126 709/203 |
| 2016/0173450 | A1 | 6/2016 | Mircescu et al. |
| 2016/0255514 | A1 | 9/2016 | Kim et al. |
| 2018/0323996 | A1 * | 11/2018 | Roman ............... H04L 12/2818 |
| 2019/0089597 | A1 | 3/2019 | Pathak et al. |
| 2019/0109921 | A1 | 4/2019 | Matsushima |
| 2019/0215687 | A1 * | 7/2019 | Ko ......................... H04W 12/55 |
| 2019/0342170 | A1 | 11/2019 | Pathak et al. |
| 2020/0065454 | A1 * | 2/2020 | Lei ......................... G06F 21/105 |
| 2021/0051182 | A1 * | 2/2021 | Milton ................ H04L 63/0272 |
| 2022/0021576 | A1 | 1/2022 | Krishnamurthy et al. |

FOREIGN PATENT DOCUMENTS

| | | | |
|---|---|---|---|
| CN | 101621414 | A | 1/2010 |
| CN | 108370379 | A | 8/2018 |
| EP | 1847126 | B1 | 8/2012 |
| EP | 3240276 | B1 * | 5/2019 ............. H04M 9/082 |
| EP | 2848055 | B1 * | 7/2019 ......... H04L 41/0896 |
| WO | WO-2010141603 | A2 * | 12/2010 ............. A61B 5/4094 |
| WO | WO-2012030259 | A1 * | 3/2012 ......... H04L 67/1004 |
| WO | 2017031534 | A1 | 3/2017 |
| WO | WO-2019219184 | A1 * | 11/2019 ............. H04L 47/10 |

OTHER PUBLICATIONS

Device-to-Device Discovery for Proximity-Based Service in LTE-Advanced System Kae Won Choi;Zhu Han IEEE Journal on Selected Areas in Communications (Year: 2015).*
Mass Configuration with Confirmation in Tactical Networks—ACM Digital Library https://dl.acm.org > doi > pdf by PK Singh • 2017 (Year: 2017).*
Implementation of SNMP-JSON translator and integrating SNMP agents with JSON based network management system Kasula Chaithanya Pramodh;Iluri Nikhil; J. Ranjith Singh 2017 7th International Conference on Communication Systems and Network Technologies (Year: 2017).*
Implementation of SNMP-JSON translator and integrating SNMP agents with JSON based network management system Kasula Chaithanya Pramodh;Iluri Nikhil; J. Ranjith Singh 2017 7th International Conference on Communication Systems and Network Technologies (Year: 2017) (Year: 2017).*
Remote Management of Non-TR-069 UPnP End-User Devices in a Private Network B. A. G. Hillen; I. Passchier; B. H. A. van Schoonhoven; F. T. H. den Hartog 2009 6th IEEE Consumer Communications and Networking Conference Year: 2009 | Conference Paper | Publisher: IEEE (Year: 2009).*
U.S. Appl. No. 16/669,830 entitled "Bulk Discovery of Devices Behind a Network Address Translation Device" (inventor: Krishnamurthy) filed Oct. 31, 2019, Juniper Networks, Inc.
Harrington et al., "An Architecture for Describing Simple Network Management Protocol (SNMP) Management Frameworks," RFC 3411, Network Working Group, the Internet Engineering Task Force draft, Dec. 2002, 64 pp.
Enns, "NETCONF Configuration Protocol," Network Working Group, RFC 4741, Dec. 2006, 96 pp.
"Junos Space—Edge Services Director User Guide" Juniper Networks, Inc., May 28, 2019, available at https://www.juniper.net/documentation/en_US/junos-space-apps/edge-services-director1.0/information-products/pathway-pages/edge-services-director-pwp.html (last accessed Nov. 6, 2020), 738 pp.
Kumari et al. "Secure Device Install" draft-ietf-opsawg-sdi-00, Network Working Group, Internet-Draft, Jul. 22, 2019, 16 pp.
Extended European Search Report dated Aug. 11, 2020 received in EP counterpart 20153285.0, 9 pp.
Communication pursuant to Article 94(3) EPC from counterpart European Application No. 20153285.0 dated Apr. 13, 2022, 6 pp.
Response to the Extended European Search Report dated Aug. 11, 2020, received in EP counterpart 20153285.0, filed Nov. 4, 2021, 14 pp.
Response to Communication pursuant to Article 94(3) EPC dated Apr. 13, 2022, from counterpart European Application No. 20153285.0 filed Aug. 12, 2022, 32 pp.
Notice of Intent to Grant and Text Intended to Grant from counterpart European Application No. 20153285.0 dated Feb. 24, 2023, 37 pp.
First Office Action and Search Report, and translation thereof, from counterpart Chinese Application No. 202010071931.6 dated Feb. 16, 2023, p. 18.

* cited by examiner

BULK DISCOVERY OF DEVICES BEHIND A NETWORK ADDRESS TRANSLATION DEVICE

TECHNICAL FIELD

This disclosure relates to computer networks, and more particularly, to discovering and configuring network devices.

BACKGROUND

A computer network is a collection of interconnected computing devices that may exchange data and share resources. A variety of devices operate to facilitate communication between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, an administrator may perform configuration tasks as well as perform operational commands to collect and view operational data of the managed devices. For example, the administrator may configure interface cards of the device, adjust parameters for supported network protocols, specify physical components within the device, modify routing information maintained by a router, access software modules and other resources residing on the device, and perform other configuration tasks. In addition, the administrator may allow a user to view current operating parameters, system logs, information related to network connectivity, network activity or other status information from the devices as well as view and react to event information received from the devices.

Network configuration services may be performed by multiple distinct devices, such as routers with service cards and/or dedicated service devices. Such services include connectivity services such as Layer Three Virtual Private Network (L3VPN), Virtual Private Local Area Network Service (VPLS), and Peer to Peer (P2P) services. Other services include network configuration services, such as Dot1q VLAN Service. Network management systems may support these services such that an administrator may easily create and manage these high-level network configuration services. In customer deployments, there may be thousands to millions of connectivity services. When the services are changed, the network management system typically deploys configuration services in the network via transactions. In some cases, there may be concurrent changes across the devices, as multiple administrators may modify the services in parallel.

Network management systems typically have an ability to discover devices in its network an automatically add them, for example, as a device object, for further management, such as pushing a configuration. For example, a user may specify a range of IP addresses or a subnet and specify credentials, such as through simple network management protocol (SNMP). The network management system may then sweep through the list of IP addresses and add all the reachable devices for further management.

SUMMARY

In general, this disclosure describes techniques for managing network devices. A network management system may discover network devices behind a network address translation device, such as a firewall, and configure the discovered network devices.

In one example, a method includes receiving, at a network management system, a model of N network devices; generating, at the network management system, a bulk activation configuration for any of the N network devices; committing, by the network management system, the bulk activation configuration on a seed network device of the N network devices; receiving, at the network management system, a request for a first connection from a first neighboring network device of the N network devices, the first neighboring network device neighboring the seed network device and having the bulk activation configuration; connecting, at the network management system, with the first neighboring network device through the first connection; determining, by the network management system, based on the model of N network devices, whether the first neighboring network device is one of the N network devices; if the first neighboring network device is one of the N network devices, generating a second activation configuration unique to the first neighboring network device; and replacing the bulk activation configuration with the second activation configuration on the first neighboring network device.

In another example, a system includes memory and one or more processors coupled to the memory, the one or more processors being configured to: receive a model of N network devices; generate a bulk activation configuration for any of the N network devices; commit the bulk activation configuration on a seed device of the N network devices; receive a request for a first connection from a first neighboring network device of the N network devices, the first neighboring network device neighboring the seed network device and having the bulk activation configuration; connect with the first neighboring network device through the first connection; determine, based on the model of N network devices, whether the first neighboring network device is one of the N network devices; if the first neighboring network device is one of the N network devices, generate a second activation configuration unique to the first neighboring network device; and replace the bulk activation configuration with the second activation configuration on the first neighboring network device.

In another example, a non-transitory computer readable medium includes instructions that when executed by one or more processors cause the one or more processors to: receive a model of N network devices; generate a bulk activation configuration for any of the N network devices; commit the bulk activation configuration on a seed device of the N network devices; receive a request for a first connection from a first neighboring network device of the N network devices, the first neighboring network device neighboring the seed network device and having the bulk activation configuration; connect with the first neighboring network device through the first connection; determine, based on the model of N network devices, whether the first neighboring network device is one of the N network devices; if the first neighboring network device is one of the N network devices, generate a second activation configuration unique to the first neighboring network device; and replace the bulk activation configuration with the second activation configuration on the first neighboring network device.

The details of one or more examples are set forth in the accompanying drawings and the description below. Other features, objects, and advantages will be apparent from the description and drawings, and from the claims.

DETAILED DESCRIPTION

When devices that an administrator may want to add to a network management system are behind a NAT device (relative to the network management system), such as a firewall, the network management system may not be able to sweep through a range of IP addresses or a subnet because network management system may not have access to the private IP addresses of the network devices behind the firewall and thereby may not be able to add them for further management. In this example, an administrator may have to manually add each of the network devices behind the firewall to the network management system. For example, an administrator could model a network device on the network management system. The network management system could generate an activation configuration for the network device. The administrator could then manually commit the activation configuration on the network device. The network management system could then wait for an outbound ssh connection from the network device. This process could be repeated to add each network device behind the NAT device. If the number of network devices behind the firewall is large, adding each of the network devices manually may be a time-consuming and tedious task. The techniques of this disclosure enable a network management system to add network devices behind a NAT device without requiring an administer to manually add all of the network devices behind the NAT device onto the network management system.

Figure 1:
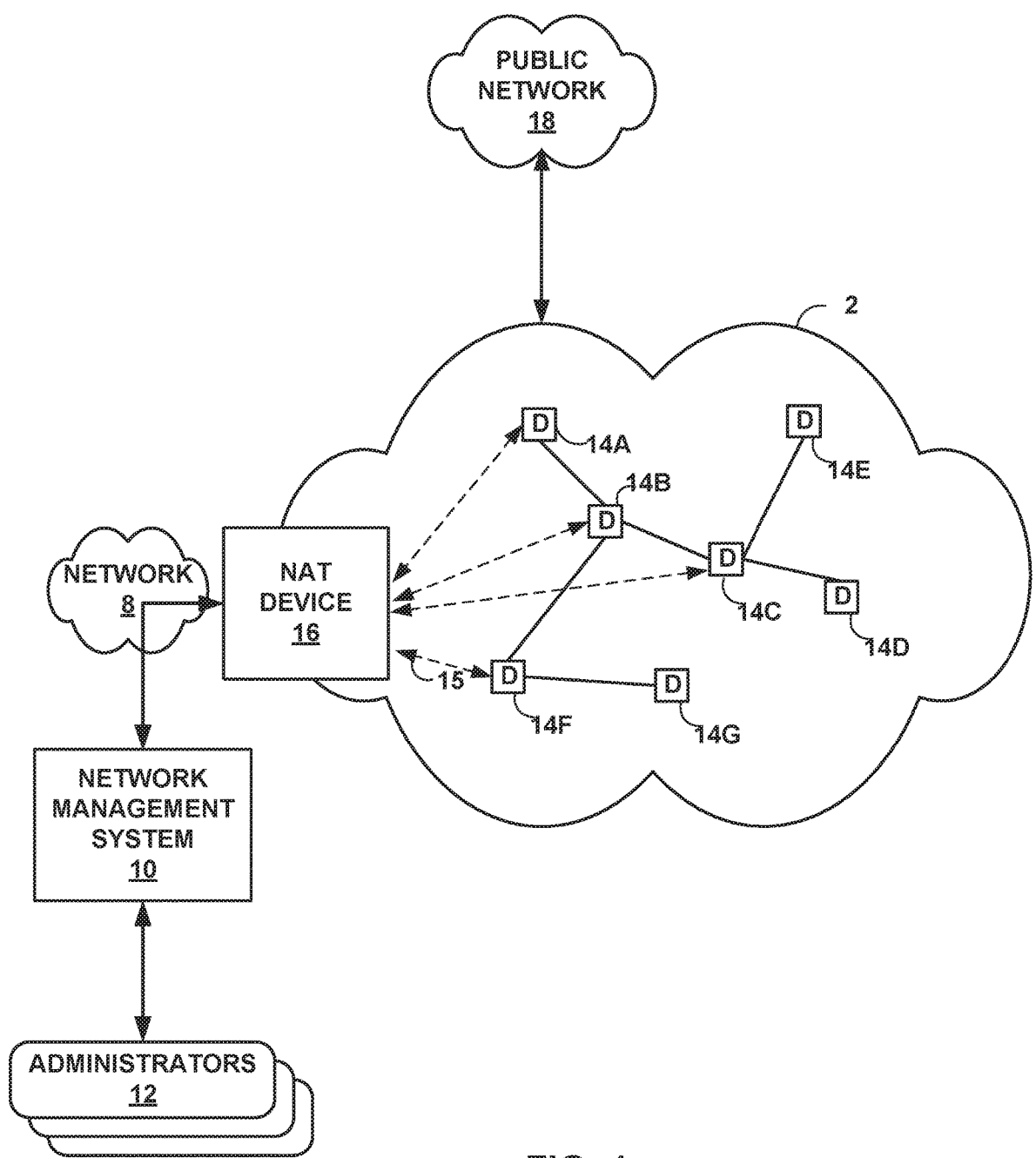
FIG. 1 is a block diagram illustrating an example including devices of an enterprise network that may be managed using a network management system according to the techniques of this disclosure.

FIG. 1 is a block diagram illustrating an example including devices of an enterprise network 2 that may be managed using a network management system 10. Managed devices 14A-14G (collectively, "network devices 14") of enterprise network 2 include network devices interconnected via communication links to form a communication topology in order to exchange resources and information. Network devices 14 may include, for example, routers, switches, gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, enterprise network 2 may transmit data according to any other discrete data unit defined by any other protocol, such as a cell defined by the Asynchronous Transfer Mode (ATM) protocol, or a datagram defined by the User Datagram Protocol (UDP). Communication links interconnecting network devices 14, network management system 10 and NAT device 16 may be physical links (e.g., optical, copper, and the like), wireless, or any combination thereof.

Enterprise network 2 is shown coupled to public network 18 (e.g., the Internet) via a communication link. Public network 18 may include, for example, one or more administrator computing devices. Public network 18 may provide access to web servers, application servers, public databases, media servers, end-user devices, and other types of network resource devices and content.

Network management system 10 is communicatively coupled to network devices 14 via enterprise network 2 through NAT device 16. In some examples, NAT device 6 may be a firewall device. Network management system 10, in some examples, forms part of a device management system, although only one device of the device management system is illustrated for purpose of example in FIG. 1. In the example of FIG. 1, network management system 10 is not connected directly to any of the network devices 14.

Once network devices 14 are deployed and activated, administrators 12 may use network management system 10 (or multiple such network management systems) to manage the network devices using a device management protocol provided the administrators 12 add the network devices to network management system 10. As mentioned above, network management system 10 may not have access to the private IP addresses of network devices 14.

One example device protocol is the Simple Network Management Protocol (SNMP) that allows network management system 10 to traverse and modify management information bases (MIBs) that store configuration data within each of managed network devices 14. Further details of the SNMP protocol may be found in Harrington et al., RFC 3411, "An Architecture for Describing Simple Network Management Protocol (SNMP) Management Frameworks," Network Working Group, the Internet Componentering Task Force draft, December 2002, available at http://tools.ietf.org/html/rfc3411, the entire contents of which are incorporated herein by reference.

In common practice, network management system 10 and network devices 14 are centrally maintained by an IT group of the enterprise. Administrators 12 interact with network management system 10 to remotely monitor and configure network devices 14. For example, administrators 12 may receive alerts from network management system 10 regarding any of network devices 14, view configuration data of network devices 14, modify the configurations data of network devices 14, add new network devices to enterprise network 2, remove existing network devices from enterprise network 2, or otherwise manipulate the enterprise network 2 and network devices therein. Although described with respect to an enterprise network, the techniques of this disclosure are applicable to other network types, public and private, including LANs, VLANs, VPNs, and the like.

In some examples, administrators 12 use network management system 10 or a local workstation to interact with network devices 14, e.g., through telnet, secure shell (ssh), or other such communication sessions. That is, network devices 14 generally provide interfaces for interaction, such as command line interfaces (CLIs), web-based interfaces, graphical user interfaces (GUIs), or the like, by which a user may interact with the devices to issue text-based commands. For example, these interfaces typically allow a user to interact with the device, e.g., through a telnet, ssh, hypertext transfer protocol (HTTP), or other network session, to enter text in accordance with a defined syntax to submit commands to the managed device. In some examples, the user initiates an ssh session over link 15 with one of network devices 14, e.g., device 14F, using network management system 10, to configure device 14F. In this manner, a user may provide commands in a format for execution to network devices 14.

Further, administrators 12 may also create scripts that may be submitted by network management system 10 to any or all of network devices 14. For example, in addition to a CLI interface, network devices 14 also provide interfaces for receiving scripts that specify the commands in accordance with a scripting language. In a sense, the scripts may be output by network management system 10 to automatically invoke corresponding remote procedure calls (RPCs) on the managed network devices 14. The scripts may conform to, e.g., extensible markup language (XML) or another data description language.

Administrators 12 uses network management system 10 to configure network devices 14 to specify certain operational characteristics that further the objectives of administrators 12. For example, administrators 12 may specify for a device, device 14C for example, a particular operational policy regarding security, device accessibility, traffic componentering, quality of service (QoS), network address translation (NAT), packet filtering, packet forwarding, rate limiting, or other policies. Network management system 10 uses one or more network management protocols designed for management of configuration data within managed network devices 14, such as the SNMP protocol or the Network Configuration Protocol (NETCONF) protocol or a derivative thereof to perform the configuration. In general, NETCONF provides mechanisms for configuring network devices and uses an Extensible Markup Language (XML)-based data encoding for configuration data, which may include policy data. NETCONF is described in Enns, "NETCONF Configuration Protocol," Network Working Group, RFC 4741, December 2006, available at tools.ietf.org/html/rfc4741. Network management system 10 may establish NETCONF sessions with one or more of network devices 14.

In general, network management system 10 maintains working drafts of candidate configurations to be applied to network devices 14, prior to committing configuration changes to network devices 14, e.g., in a private data store. Network management system devices that support a private data store persist private copies of data in the private data store separately, until the private copy is committed to a database. Data change requests in one draft need to be checked for conflicts with other drafts and persist the changes. This occurs in the business layer and conflicts detection does not occur in real time. Examples of techniques for detection of conflicts across multiple proposed changes to configuration data is discussed in greater detail in Chandrasekhar et al., "PROCESSING MULTIPLE PARALLEL HIGH LEVEL CONFIGURATION CHANGES FOR MANAGED NETWORK DEVICES," U.S. Pat. No. 10,374,886, issued on Aug. 6, 2019, the entire contents of which are hereby incorporated by reference.

In the example of FIG. 1, network devices 14A-G are behind NAT device 16 with respect to network management system 10. In this example, network management system 10 may also manage other network devices (not shown) that are not behind a NAT device 16 with respect to network management system 10. For example, network management system 10 may manage network devices in network 8. With a configuration like the example of FIG. 1, typically network devices 14A-G would have to be manually added on to network management system 10 as network management system 10 may not have access to the private IP addresses of network devices 14A-G.

While network management system 10 may have access to the IP addresses of network devices not behind a NAT device, network management system 10 may not have access to the private IP addresses of network devices 14. As such, it may be desirable to enable network management system 10 to add and configure network devices 14 without administrators 12 having to manually add each network device 14 into network management system 10. For example, an administrator may model N number of devices of network devices 14 and commit an activation configuration on a seed device. The seed device may commit the activation configuration to other network devices 14 and those network devices 14 may establish an outbound ssh connection with network management system 10. Network management system 10 may then configure the network devices 14.

According to the techniques of this disclosure, a network management system, e.g. network management system 10, may create a bulk activation configuration which may be committed to a number (N) of network devices and network management system 10 may utilize this bulk activation configuration to discover and configure N network devices within a network such as network 2.

According to techniques of this disclosure, network management system 10 may discover and configure network devices 14 behind NAT device 16. For example, an administrator 12 may model a number (N) of network devices on network management system 10. N may be any integer number and N represents a maximum number of network devices that may be configured using the bulk activation configuration. The limit of N may be selected for security purposes, so as to not permit countless network devices from being connected to network management system 10. Network management system 10 may generate the bulk activation configuration. The administrator 12 may select a seed network device, such as network device 14A, and manually commit the bulk activation configuration on seed network device 14A. Alternatively, network management system 10 may commit the bulk activation configuration on seed network device 14A, for example, through the use of a script.

Seed network device 14A may negotiate with a neighboring network device, such as network device 14B. During negotiation, seed network device 14A may automatically commit the bulk activation configuration on first neighboring network device 14B. Seed network device 14A may push the bulk activation configuration to first neighboring network device 14B through an LLDP-based configuration auto-commit, thereby automatically committing the bulk activation configuration on first neighboring network device 14B. For example, first neighboring network device 14B may have Data Center Bridging Capability Exchange (DCBX) protocol enabled on an interface (not shown in FIG. 1) to which first neighboring network device 14B is connected to seed network device 14A. There may be an "activation configuration" type-length-value (TLV), e.g., a vendor-specific attribute, within the DCBX that enables seed network device 14A to push an activation configuration onto first neighboring network device 14B.

A neighboring network device that neighbors seed network device 14A (e.g., network device 14B) may request a first connection with network management system 10. In some examples, the neighboring network device need not be an immediate neighbor of seed network device 14A. A first connection may be established between network management system 10 and first neighboring network device 14B. In some examples network management system 10 may establish the first connection. In other examples, the first neighboring network device 14B may establish the first connection. In some examples, the first connection between the network management system 10 and first neighboring network device 14B may be a secure shell (ssh) connection.

During the first connection, network management system 10 may determine whether first neighboring network device 14B is one of the N network devices. For example, network management system 10 may determine if the number of bulk activation configurations network management system 10 has already handled has reached N. For example, network management system 10 may keep a count of how many bulk activation configurations it has already performed and store the count in memory. If the number of bulk activation configurations network management system 10 has already handled has reached N, network management system 10 may determine that first neighboring network device 14B is not one of the N network devices. If the number of bulk activation configurations network management system 10 has already handled has not reached N, network management system 10 may determine that first neighboring network device 14B may be one of the N network devices.

Additional security measures may include the use of a device ID and/or a secret or key associated with the bulk activation configuration. Network management system 10 may receive from first neighboring network device 14B a device identification (ID) that may be indicative of neighboring network device 14B being one of the N number of network devices that were modeled. In other words, the device ID may be unique to the bulk activation configuration, but not unique to any network device with the bulk activation configuration. Each network device having the bulk activation configuration may have the same device ID that identifies it as having the bulk activation configuration.

Network management system 10 may compare the device ID received from first neighboring network device 14B to a device ID stored in memory on network management system 10 that is associated with the bulk activation configuration. Based on the received device ID matching the stored device ID, network management system may determine that first neighboring network device 14B is one of the N network devices. In some examples, the device ID may be an alphanumeric identifier, such as 39f5bb9f-be78-4097-b725. In other examples, the device ID may be a Boolean flag.

In some examples, network management system 10 may also receive from network device 14B a secret or key. In such a case, network management system 10 may also compare the secret received from first neighboring network device 14B to a secret stored in memory on network management system 10 that is associated with the bulk activation configuration. Based on the received device ID and the received secret matching the stored device ID and secret, network management system 10 may determine that neighboring network device is one of the N network devices. In some examples, the secret may be a mix of alphanumeric and special characters such as $9$z7HqFCtBlhlvWQFKMX7Vb5Qz. Network management system may then automatically model first neighboring network device 14B and automatically create a second activation configuration for first neighboring network device 14B and replace the existing bulk activation configuration on first neighboring network device 14B with the second activation configuration. The second activation configuration may be unique for first neighboring network device 14B.

In some examples, after first neighboring network device 14B is configured with the bulk activation configuration, but before first neighboring network device 14B is configured with the second activation configuration, first neighboring network device 14B may negotiate with a second neighboring network device, such as network device 14C. During negotiation, first neighboring network device 14B may automatically commit the bulk activation configuration on second neighboring network device 14C in a similar manner to the way seed network device 14A automatically committed the bulk activation configuration on first neighboring network device 14B. Second neighboring network device 14C may then request to connect with network management system 10 and network management system 10 may determine if second neighboring network device 14C is one of the N network devices and continue the process as network management system did with first neighboring network device 14B. The automatic commits may propagate throughout network 2 by network devices pushing the bulk activation configuration to other network devices.

In this fashion, the techniques of this disclosure enable bulk discovery of up to N devices behind a NAT device, such as NAT device 16, without requiring time consuming and tedious manual modeling and configuration of each device behind the NAT device. As mentioned above, network management system 10 may not have access to the private IP addresses of network devices behind a NAT device and therefore may not be able to sweep through an IP address list to discover network devices behind a NAT device. These techniques of this disclosure may enable network operators to save costs as well as fewer administrator resources may be needed.

Figure 2:
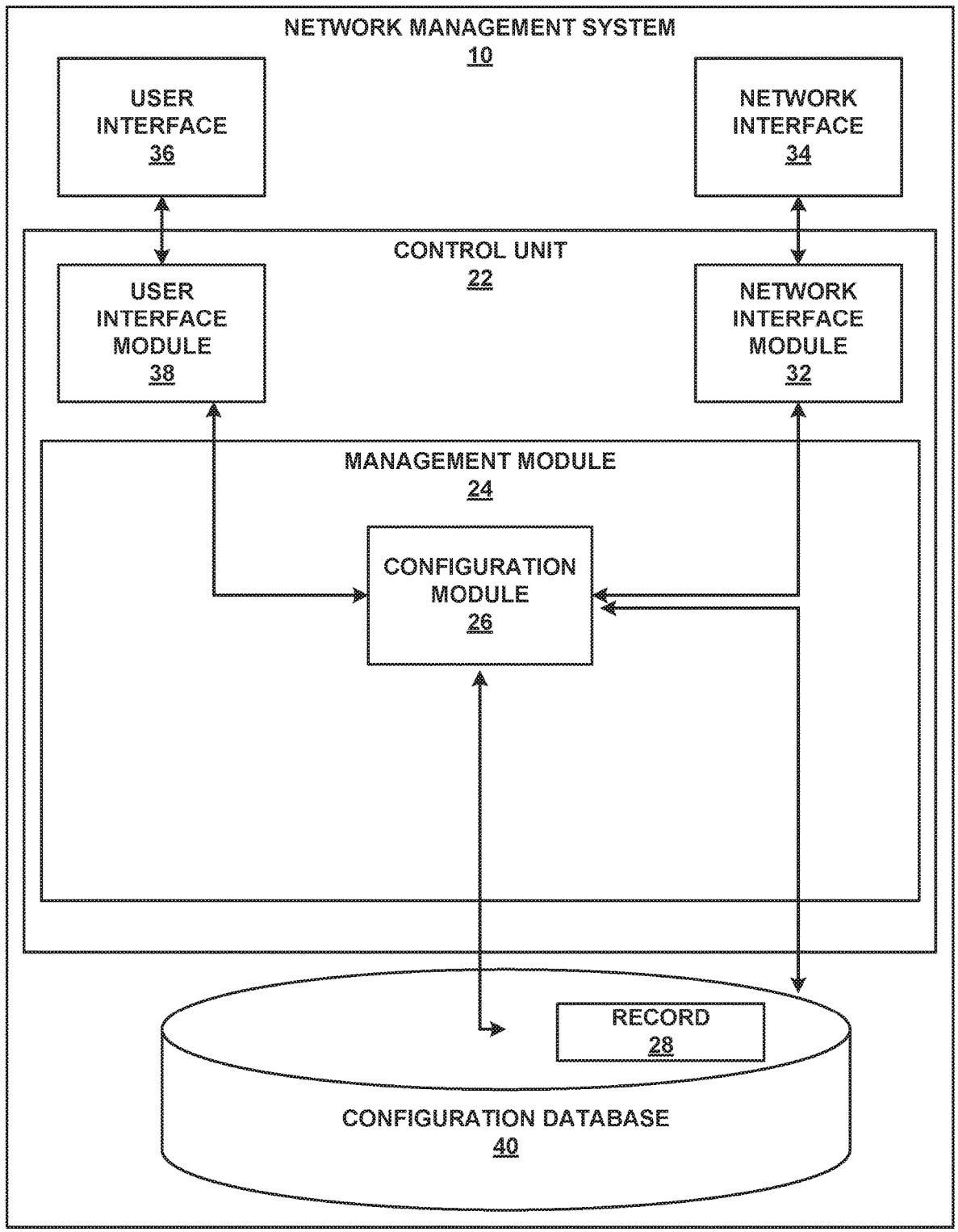
FIG. 2 is a block diagram illustrating an example set of components for the network management system of FIG. 1.

FIG. 2 is a block diagram illustrating an example set of components for network management system 10 of FIG. 1. In this example, network management system 10 includes control unit 22, network interface 34, and user interface 36. Network interface 34 represents an example interface that may communicatively couple a network device (not shown) to an external device, e.g., one of network devices 14A-14G of FIG. 1. Network interface 34 may represent a wireless and/or wired interface, e.g., an Ethernet interface or a wireless radio configured to communicate according to a wireless standard, such as one or more of the IEEE 802.11 wireless networking protocols (such as 802.11 a/b/g/n or other such wireless protocols). Network management system 10 may include multiple network interfaces in various examples, although only one network interface is illustrated for purposes of example.

Control unit 22 represents any combination of hardware, software, and/or firmware for implementing the functionality attributed to control unit 22 and its constituent modules and devices. When control unit 22 includes software or firmware, control unit 22 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

User interface 36 represents one or more interfaces by which a user, such as administrators 12 (FIG. 1), interacts with network management system 10, e.g., to provide input and receive output. For example, user interface 36 may represent one or more of a monitor, keyboard, mouse, touchscreen, touchpad, trackpad, speakers, camera, microphone, or the like. Furthermore, although in this example network management system 10 includes a user interface, administrators 12 need not directly interact with network management system 10, but instead may access network management system 10 remotely, e.g., via network interface 34.

In this example, control unit 22 includes user interface module 38, network interface module 32, and management module 24. Control unit 22 executes user interface module 38 to receive input from and/or provide output to user interface 36. Control unit 22 also executes network interface module 32 to send and receive data (e.g., packets) via network interface 34. User interface module 38, network interface module 32, and management module 24 may again be implemented as respective hardware units, or in software or firmware, or a combination thereof.

Functionality of control unit 22 may be implemented as one or more processing units in fixed or programmable digital logic circuitry. Such digital logic circuitry may include one or more microprocessors, digital signal processors (DSPs), application specific integrated circuits (ASICs), field programmable gate arrays (FPGAs), or any other equivalent integrated or discrete logic circuitry, as well as any combination of such components. When implemented as programmable logic circuitry, control unit 22 may further include one or more computer readable storage media storing hardware or firmware instructions to be executed by processing unit(s) of control unit 22.

Control unit 22 executes management module 24 to manage various network devices, e.g., network devices 14A-14G of FIG. 1. Management includes, for example, configuring the network devices according to instructions received from a user (e.g., administrators 12 of FIG. 1) and providing the user with the ability to submit instructions via user interface 36 to configure the network devices. In some examples, management module 24 is a software process such as a management daemon or management application. In this example, management module 24 further includes configuration module 26.

For example, control unit 22 may create a bulk activation configuration for up to N devices, commit the bulk activation configuration on a seed device through network interface 34, receive requests to connect from other network devices through network interface 34, determine whether the other network devices are within the N network devices, based on the other network devices being within the N network devices, automatically model and generate a unique activation configuration for each separate network device within the N network devices (each of the activation configurations being different from each other) and commit, through network interface 34, the unique activation configurations on the network devices within the N network devices.

Management module 24 is configured to receive configuration instructions for a set of managed network devices from a user via user interface 36, such as administrators 12. One such example is the bulk activation configuration described above. Over time, the user may update the configuration instructions, e.g., to add new services, remove existing services, or modify existing services performed by the managed devices.

Network management system 10 also includes configuration database 40. Configuration database 40 generally includes information describing managed network devices, e.g., network devices 14. For example, configuration database 40 may include information indicating device identifiers (such as MAC and/or IP addresses), device type, device vendor, devices species (e.g., router, switch, bridge, hub, etc.), or the like. Configuration database 40 also stores current configuration information for the managed devices (e.g., network devices 14). In the example where network management system 10 is network management system 10, configuration database 40 may contain a record 28 indicative of the bulk activation configuration. Network management system 10 may also store an indication of the value of N. As discussed above N may be any integer number and is configurable by an administrator 12 through user interface 36. Record 28 may contain a representation of the bulk activation configuration. Record 28 may contain the device ID and/or secret associated with the bulk activation configuration.

Although user interface 36 is described for as allowing administrators 12 (FIG. 1) to interact with network management system 10, other interfaces may be used in other examples. For example, network management system 10 may include a representational state transfer (REST) administrator (not shown) that may act as an interface to another device, by which administrators 12 may configure network management system 10. Likewise, administrators 12 may configure network devices 14 by interacting with network management system 10 through the REST administrator.

Figure 3:
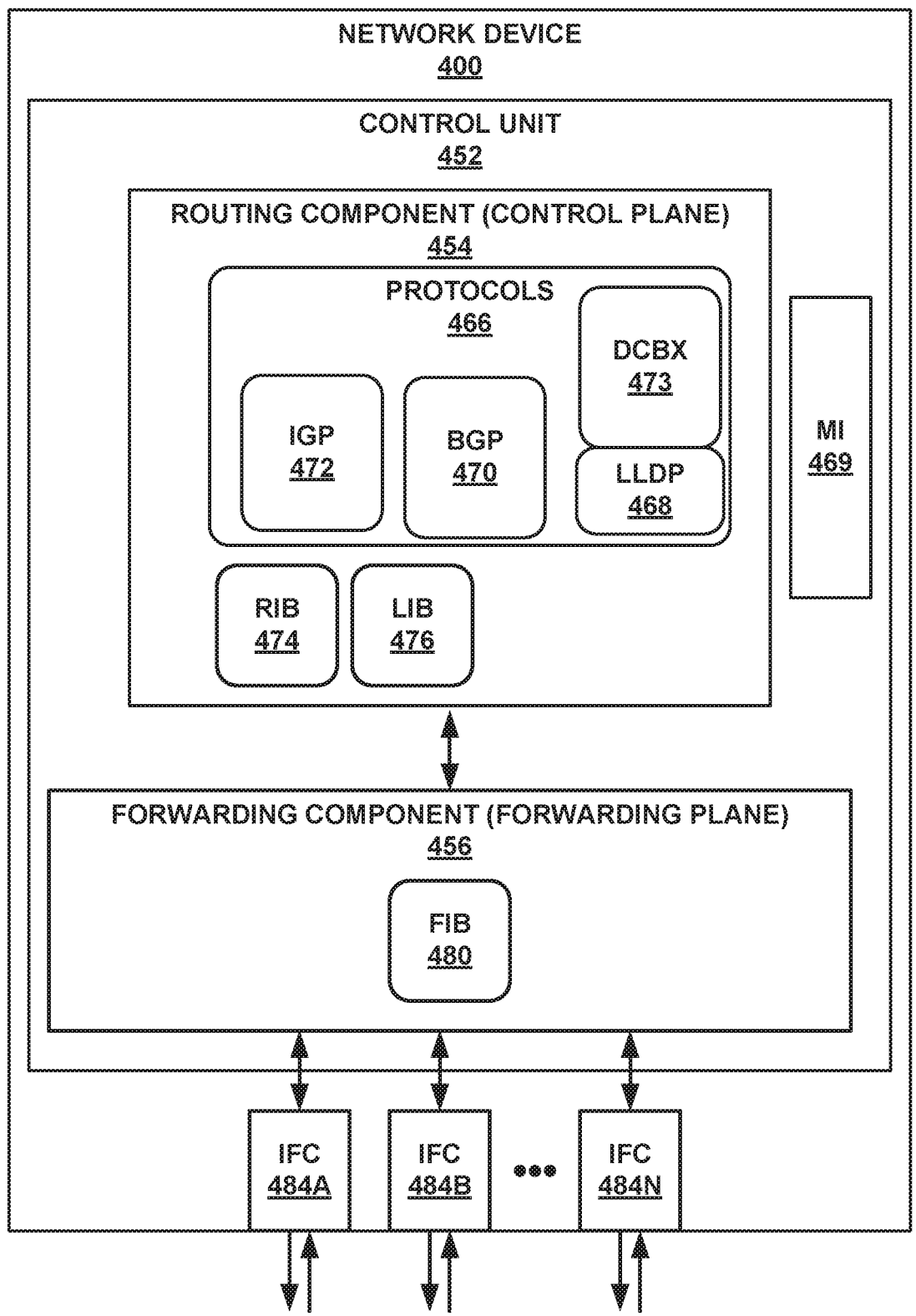
FIG. 3 is a block diagram illustrating an example network device according to techniques of this disclosure.

FIG. 3 is a block diagram of an example network device 400. Network device 400 may be any of network devices 14A-14G. In the illustrated example of FIG. 3, network device 400 includes a control unit 452 with a routing component 454 that provides control plane functionality for the network device and a forwarding component 456 that provides forwarding or data plane functionality for the network device to send and receive traffic by a set of interface cards 484A-484N ("IFCs 484") that typically have one or more physical network interface ports. Control unit 452 may include one or more daemons (not shown) that comprise user-level processes that run network management software execute routing protocols to communicate with peer routers or switches, maintain and update one or more routing tables in routing component 454, and create one or more forwarding tables for installation in forwarding component 456, among other functions. Although illustrated for purposes of example as having routing functionality, in some examples, network device 400 may be a switch or other network device that does not include routing functionality, and various components of network device 400, such as routing component 454, are optional and may be omitted in some examples.

Control unit 452 may also include management interface 469. Management interface 469 may be used to interface with network management system 10. For example, management interface 469 may utilize a version of SNMP or NETCONF (not shown) to communicate with network management system 10.

Forwarding component 456 performs packet switching and forwarding of incoming data packets for transmission over a network. As shown in FIG. 3, forwarding component 456 includes a forwarding information base (FIB) 480 that stores forwarding data structures associating network destinations with next hops and outgoing interfaces. Although not shown in FIG. 3, forwarding component 456 may comprise a central processing unit (CPU), memory and one or more programmable packet-forwarding application-specific integrated circuits (ASICs).

Routing component 454 includes various protocols 466 that perform routing functions for network device 400. In the illustrated example of FIG. 3, routing component 454 includes BGP 470 and IGP 472 as routing protocols used to exchange routing information with other routing devices in a network in order to discover the network topology and update a routing information base (RIB) 474. In the examples described in this disclosure, IGP 472 may be a link-state routing protocol such as open shortest path first (OSPF) or intermediate system-intermedia system (IS-IS).

RIB 474 may describe the topology of the network in which network device 400 resides, and may also describe various routes within the network and the appropriate next hops for each route, i.e., the neighboring routing devices along each of the routes. Routing component 454 analyzes the information stored in RIB 474 to generate forwarding information. Routing component 454 then installs forwarding data structures into FIB 480 within forwarding component 456. FIB 480 associates network destinations with specific next hops and corresponding interface ports within the forwarding plane. LIB 476 maintains mappings of next hop labels to the next hops for each route within the network from RIB 474.

As discussed above with respect to FIG. 2, a network device 400, such as first neighboring network device 14B, may have DCBX 473 enabled. DCBX 473 may be a DCBX protocol extended to support sending messages that include an activation configuration TLV that enable activation configurations to be pushed onto network device 400, in accordance with the techniques of this disclosure. Network device 400 also contains LLDP 468 as one of its protocols 466.

Data Center Bridging Capabilities Exchange Protocol (DCBX) is a discovery and capability exchange protocol that is used for conveying capabilities and configuration of the above features between neighbors to ensure consistent configuration across the network. DCBX leverages functionality provided by IEEE 802.1AB (LLDP). DCBX is included in the 802.1az standard.

For example, where network device 400 acts as a seed network device such as seed network device 14A, network device 400 may receive a bulk activation configuration from network management system 10 through management interface 469. Network management system 10 may configure network device 400 with the bulk activation configuration. Network device 400 may then negotiate with a neighboring network device, such as network device 14B. During negotiations, network device 400 may send a message containing an activation configuration TLV to neighboring network device 14B. In some examples, the message containing activation configuration TLV may be a DCBX message in accordance with a DCBX protocol extended to support the activation configuration TLV. The activation configuration TLV may include a request to configure neighboring network device 14B. The activation configuration TLV may also include information regarding the bulk activation configuration sufficient to enable the configuration of neighboring network device 14B with the bulk activation configuration. For example, the activation configuration TLV may include the device ID and the secret associated with the bulk activation configuration. The activation configuration TLV may also include information that identifies network management system 10, such as network management system 10's IP address.

In the case where network device 400 acts as a neighboring network device, such as neighboring network device 14B, network device 400 may receive the message containing the activation configuration TLV from seed network device 14A. Network device 400 may be configured to, in response to receiving the message containing the activation configuration TLV, use DCBX protocol of 473 to extract the information from the activation configuration TLV and automatically configure itself (network device 400 acting as neighboring network device 14B) using the bulk activation configuration specified by the activation configuration TLV. In other examples, network device 400 may send a message to seed network device 14A permitting seed network device 14A to configure network device 400 and seed network device 14A may configure network device 400 with the bulk activation configuration. Network device 400 acting as a neighboring network device may store information relating to the bulk activation configuration in memory (not shown).

Network device 400, acting as neighboring network device 14B, may attempt to connect to network management system 10 through management interface 469 using, for example, the identifying information provided in the activation configuration TLV, through for example an outbound ssh connection. Network management system 10 may then determine whether network device 400 is one of the N network devices, automatically model network device 400, and generate a new and unique activation configuration and commit the new and unique activation configuration on network device 400.

This process may continue with seed network device 14A and neighboring network device 14B negotiating with other network devices and providing the other network devices with the activation configuration TLV, until the lower of all network devices having the capability of being configured in this fashion or N network devices are configured. In this manner, the techniques of this disclosure enable bulk discovery of up to N devices behind a NAT device, such as NAT device 16, without requiring time consuming and tedious manual configuration of each device behind the NAT device.

Figure 4:
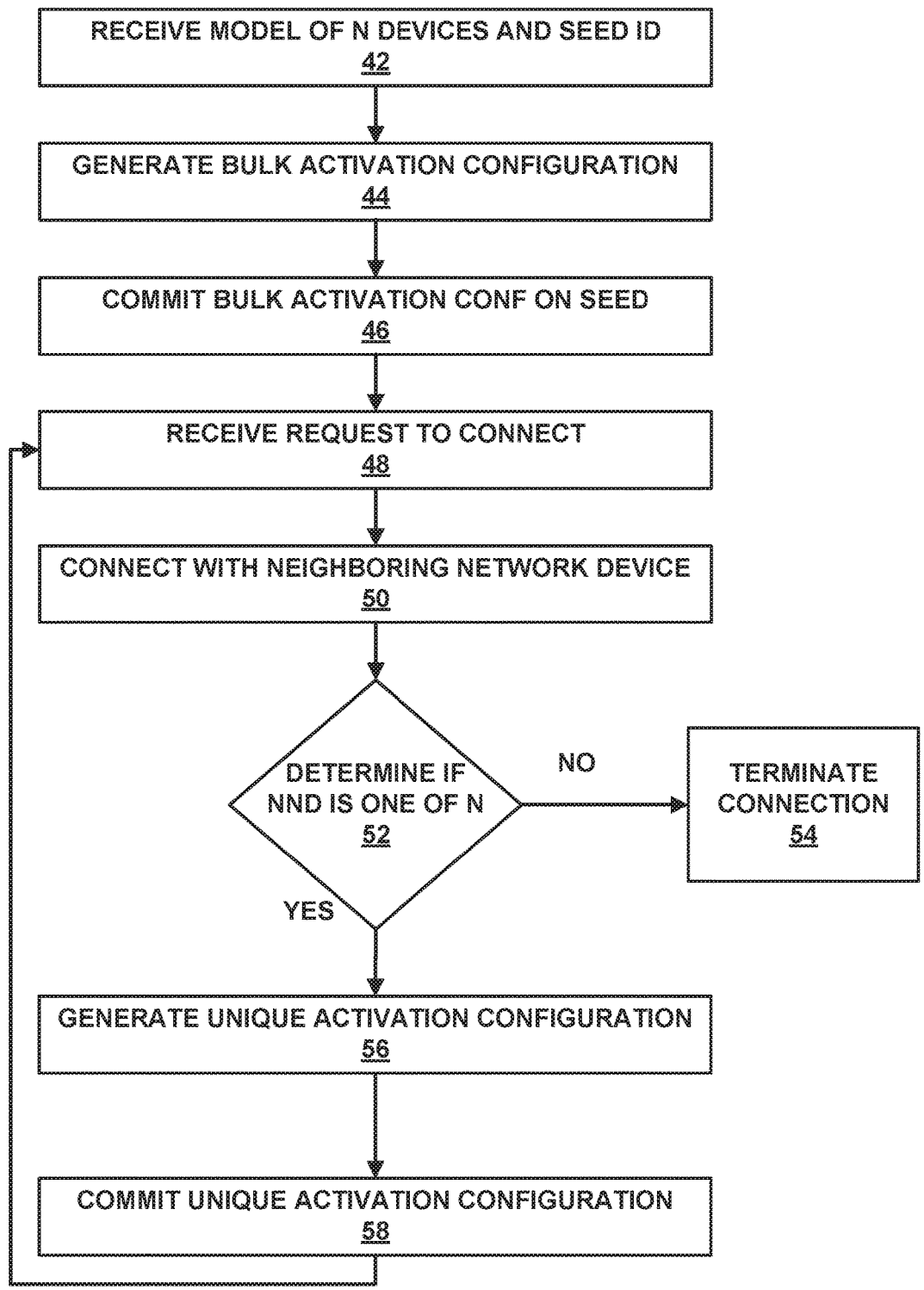
FIG. 4 is a flow diagram illustrating further techniques of this disclosure.

FIG. 4 is a flow diagram of a method of network management illustrating techniques of this disclosure. Network management system 10 may receive a model of a number (N) devices (42) and the identification of seed network device 14A. Network management system 10 may receive the model of N devices and the identification of seed network device 14A from an administrator 12 through user interface 36, for example. N may be any integer number and N represents a maximum number of network devices that may be configured using the bulk activation configuration.

Network management system 10 may generate the bulk activation configuration and may store information associated with the bulk activation configuration in record 28 in configuration database 40 (44). Record 28 may contain a representation of the bulk activation configuration or may contain information relating to the bulk activation configuration, such as the device ID and the secret discussed above. Network management system 10 may then commit the bulk activation configuration on seed network device 14A (46). For example, network management system may connect to seed network device 14A through network interface 34. The commitment may be performed manually by an administrator 12 through user interface 36 of network management system 10, for example. In other examples, network management system 10 may commit the bulk activation through a script.

Network management system 10 may receive a request for a first connection from a first neighboring network device 14B that neighbors seed network device 14A (48). In some examples, the neighboring network device need not be an immediate neighbor of seed device 14A. The first connection may be made between network management system 10 and first neighboring network device 14B (50). In some examples network management system 10 may establish the first connection. In other examples, the first neighboring network device 14B may establish the first connection.

Network management system 10 may determine if first neighboring network device 14B is one of the N network devices (52). For example, network management system 10 may determine if the number of bulk activation configurations network management system 10 has already handled has reached N. For example, network management system 10 may keep a count of the number of bulk activation configurations network management system 10 has performed and store the count in memory, such as in record 28. If the number of bulk activation configurations network management system 10 has already handled has reached N, network management system 10 may determine that first neighboring network device 14B is not one of the N network devices. If the number of bulk activation configurations network management system 10 has already handled has not reached N, network management system 10 may determine that first neighboring network device 14B may be one of the N network devices.

Network management system 10 may also receive from network device 14B a device identification (ID) that is indicative of first neighboring network device 14B being one of the N number of network devices that were modeled. Network management system 10 may compare the device ID received from first neighboring network device 14B to the device ID stored in record 28 on network management system 10 that is associated with the bulk activation configuration. Based on the received device ID matching the stored device ID, network management system 10 may determine that first neighboring network device 14B is one of the N network devices. Based on the received device ID not matching the stored device ID, network management system 10 may determine that neighboring network device is not one of the N network devices.

In some examples, network management system 10 may also receive from first neighboring network device 14B network device a secret or key. In such a case, network management system may compare device ID and the secret received from the first neighboring network device 14B to the device ID and a secret stored in record 28 in network management system 10. Based on the received device ID and the received secret matching the stored device ID and secret, network management system 10 may determine that first neighboring network device 14B is one of the N network devices. Based on either the received device ID not matching the stored device ID or the received secret not matching the stored secret, network management system 10 may determine that neighboring network device is not one of the N network devices.

If network management system 10 determines that first neighboring network device 14B is not one of the N network devices (the "NO" path in FIG. 5), network management system 10 may terminate the first connection (54). If network management system 10 determines that first neighboring network device 14B is one of the N network devices (the "YES path in FIG. 5) network management system 10 may automatically model first neighboring network device 14B and generate a new, in this case a second, activation configuration (56). Network management system 10 may then replace the bulk activation configuration on first neighboring network device 14B with the second activation configuration (58). The second activation configuration may be a unique configuration for first neighboring network device 14B.

The automatic commits may propagate throughout network 2 by network devices pushing the bulk activation configuration to other network devices. Thus, network management system 10 may receive further request to connect from other network devices (48) and network management system 10 may repeat the process of boxes (48) through (58) until the first of all the discoverable network devices are discovered or until N network devices are discovered.

For example, network management system may receive a request for a second connection from second neighboring network device 14C that neighbors seed first neighboring network device 14B (48). In some examples, the neighboring network device need not be an immediate neighbor of first neighboring network device 14B. The second connection may be made between network management system 10 and second neighboring network device 14C (50). In some examples network management system 10 may establish the second connection. In other examples, second neighboring network device 14C may establish the second connection.

Network management system 10 may determine if second neighboring network device 14C is one of the N network devices (52) in the manner discussed above with respect to first neighboring network device 14B. For example, network management system 10 may determine if the number of bulk activation configurations network management system 10 has already handled has reached N.

If network management system 10 determines that second neighboring network device 14C is not one of the N network devices (the "NO" path in FIG. 5), network management system 10 may terminate the second connection (54). If network management system 10 determines that second neighboring network device 14C is one of the N network devices (the "YES path in FIG. 5) network management system 10 may automatically model second neighboring network device 14C and generate a new, in this case a third, activation configuration (56). Network management system 10 may then replace the bulk activation configuration on second neighboring network device 14C with the third activation configuration (58). The third activation configuration may be a unique configuration for second neighboring network device 14C. In this manner, network management system 10 may automatically discover network devices behind a NAT device, such as a firewall, without having to have an administrator manually add each network device onto network management system 10.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A network management system comprising:
   memory; and
   one or more processors coupled to the memory, the one or more processors being configured to:
   receive a model of N network devices, the model including configuration instructions for the N network devices, wherein the N network devices are positioned in a network behind a Network Address Translation device relative to the network management system, and wherein N represents a maximum number of network devices that may be configured using a bulk activation configuration, wherein the bulk activation configuration comprises a device identifier (ID);
   generate the bulk activation configuration for any of the N network devices;
   commit the bulk activation configuration on a seed device of the N network devices;
   receive a request, from a first neighboring network device of the N network devices, for a first connection between the first neighboring network device and the network management system, the first neighboring network device neighboring the seed network device and having the bulk activation configuration;
   connect with the first neighboring network device through the first connection;
   determine, based at least in part on the model of N network devices and comparing a received device ID provided by the first neighboring network device to the device ID, that the first neighboring network device is one of the N network devices;
   in response to determining that the first neighboring network device is one of the N network devices, generate a second activation configuration unique to the first neighboring network device; and
   replace the bulk activation configuration with the second activation configuration on the first neighboring network device.

2. The network management system of claim 1, wherein the first neighboring network device received the bulk activation configuration from the seed network device through link layer data protocol (LLDP).

3. The network management system of claim 2, wherein the first neighboring network device received the bulk activation configuration from the seed network device through a Data Center Bridging Capability Exchange protocol (DCBX) extension to LLDP.

4. The network management system of claim 3, wherein the seed network device committed the bulk activation configuration on the first neighboring network device by sending a DCBX message that includes an activation configuration type-length-value (TLV).

5. The network management system of claim 1, wherein the one or more processors are further configured to:
   receive a request for a second connection from a second neighboring network device of the N network devices;
   connect with the second neighboring network device through the second connection;
   determine, based on the model of N network devices, whether the second neighboring network device is one of the N network devices;
   if the second neighboring network device is one of the N network devices, generate a third activation configuration unique to the second neighboring network device; and
   replace the bulk activation configuration with the third activation configuration on the second neighboring network device.

6. The network management system of claim 1, wherein the one or more processors determine whether the first neighboring network device is one of the N devices based at least in part upon comparing N to a count of the number of network devices on which the network management system has replaced the bulk activation configuration with a unique activation configuration.

7. The network management system of claim 1, wherein the device ID is not unique to any of the N devices.

8. The network management system of claim 1, wherein the bulk activation configuration comprises a secret and the one or more processors determine whether the first neighboring network device is one of the N devices based at least in part upon comparing a received secret provided by the first neighboring network device to the secret.

9. The network management system of claim 1, wherein the first connection comprises a secure shell (ssh) connection.

10. A method comprising:
    receiving, at a network management system, a model of N network devices, the model including configuration instructions for the N network devices, wherein the N network devices are positioned in a network behind a Network Address Translation device relative to the network management system, and wherein N represents a maximum number of network devices that may be configured using a bulk activation configuration, wherein the bulk activation configuration comprises a device identifier (ID);
    generating, at the network management system, the bulk activation configuration for any of the N network devices;
    committing, by the network management system, the bulk activation configuration on a seed network device of the N network devices;
    receiving, at the network management system and from a first neighboring device of the N network devices, a request for a first connection between the first neighboring network device and the network management system, the first neighboring network device neighboring the seed network device and having the bulk activation configuration;

connecting, at the network management system, with the first neighboring network device through the first connection;

determining, by the network management system, based at least in part on the model of N network devices and comparing a received device ID provided by the first neighboring network device to the device ID, that the first neighboring network device is one of the N network devices;

in response to determining that the first neighboring network device is one of the N network devices, generating a second activation configuration unique to the first neighboring network device; and replacing the bulk activation configuration with the second activation configuration on the first neighboring network device.

11. The method of claim 10, wherein the first neighboring network device received the bulk activation configuration from the seed network device through link layer data protocol (LLDP).

12. The method of claim 11, wherein the first neighboring network device received the bulk activation configuration from the seed network device through a Data Center Bridging Capability Exchange protocol (DCBX) extension to LLDP.

13. The method of claim 12, wherein the seed network device committed the bulk activation configuration on the first neighboring network device by sending a DCBX message that includes an activation configuration type-length-value (TLV).

14. The method of claim 10, further comprising:

receiving, by the network management system, a request for a second connection from a second neighboring network device of the N network device;

connecting, at the network management system, with the second neighboring network device through the second connection;

determining, by the network management system and based on the model of N network devices, whether the second neighboring network device is one of the N network devices;

if the second neighboring network device is one of the N network devices, generating, by the network management system, a third activation configuration unique to the second neighboring network device; and replacing, by the network management system, the bulk activation configuration with the third activation configuration on the second neighboring network device.

15. The method of claim 10, wherein determining whether the first neighboring network device is one of the N devices is based at least in part upon comparing N to a count of the number of network devices on which the network management system has replaced the bulk activation configuration with a unique activation configuration.

16. The method of claim 10, wherein the device ID is not unique to any of the N devices.

17. The method of claim 10, wherein the bulk activation configuration comprises a secret and the determining whether the first neighboring network device is one of the N devices is based at least in part upon comparing a received secret provided by the first neighboring network device to the secret.

18. A non-transitory computer readable medium comprising instructions that when executed by one or more processors of a network management system cause the one or more processors to:

receive a model of N network devices, the model including configuration instructions, wherein the N network devices are positioned in a network behind a Network Address Translation device relative to the network management system, and wherein N represents a maximum number of network devices that may be configured using a bulk activation configuration, wherein the bulk activation configuration comprises a device identifier (ID);

generate the bulk activation configuration for any of the N network devices;

commit the bulk activation configuration on a seed device of the N network devices;

receive a request, from a first neighboring network device of the N network devices, for a first connection between the first neighboring network device and the network management system, the first neighboring network device neighboring the seed network device and having the bulk activation configuration;

connect with the first neighboring network device through the first connection;

determine, based at least in part on the model of N network devices and comparing a received device ID provided by the first neighboring network device to the device ID, that the first neighboring network device is one of the N network devices;

in response to determining that the first neighboring network device is one of the N network devices, generate a second activation configuration unique to the first neighboring network device; and replace the bulk activation configuration with the second activation configuration on the first neighboring network device.

* * * * *